(12) United States Patent
Crapo et al.

(10) Patent No.: US 6,946,760 B2
(45) Date of Patent: Sep. 20, 2005

(54) BRUSHLESS PERMANENT MAGNET MOTOR WITH HIGH POWER DENSITY, LOW COGGING AND LOW VIBRATION

(75) Inventors: Alan D. Crapo, Florissant, MO (US); Gary E. Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 36 days.

(21) Appl. No.: 10/690,886

(22) Filed: Oct. 22, 2003

(65) Prior Publication Data

US 2005/0088047 A1 Apr. 28, 2005

(51) Int. Cl.[7] .................................................. H02K 5/24
(52) U.S. Cl. ........................................ 310/51; 310/216
(58) Field of Search .......................... 310/51, 216–218, 310/254, 261

(56) References Cited

U.S. PATENT DOCUMENTS

| | | |
|---|---|---|
| 3,860,843 A | 1/1975 | Kawasaki et al. |
| 4,719,378 A | 1/1988 | Katsuma et al. |
| 5,675,196 A | 10/1997 | Huang et al. |
| 5,786,651 A * | 7/1998 | Suzuki ........................ 310/259 |
| 5,907,206 A | 5/1999 | Shiga et al. |
| 5,918,360 A * | 7/1999 | Forbes et al. ................. 29/596 |
| 6,093,984 A | 7/2000 | Shiga et al. |
| 6,166,474 A | 12/2000 | Kohara et al. |
| 6,181,047 B1 | 1/2001 | Nitta |

FOREIGN PATENT DOCUMENTS

| | | |
|---|---|---|
| EP | 0 848 482 A2 | 6/1998 |
| EP | 0 982 425 A2 | 3/2000 |
| GB | 1 354 144 | 5/1974 |
| JP | 7-308057 | 11/1995 |

* cited by examiner

*Primary Examiner*—Thanh Lam
(74) *Attorney, Agent, or Firm*—Harness, Dickey & Pierce, P.L.C.

(57) ABSTRACT

A brushless permanent magnet electric machine includes a stator assembly having a stator core that defines (12×n) slots and stator teeth having a generally "T"-shaped cross section. Winding wire is wound around the stator teeth, wherein a radially outer edge of the stator teeth define a crowned surface. A rotor includes permanent magnets defining (12±2)n poles, wherein n is an integer greater than zero.

15 Claims, 9 Drawing Sheets

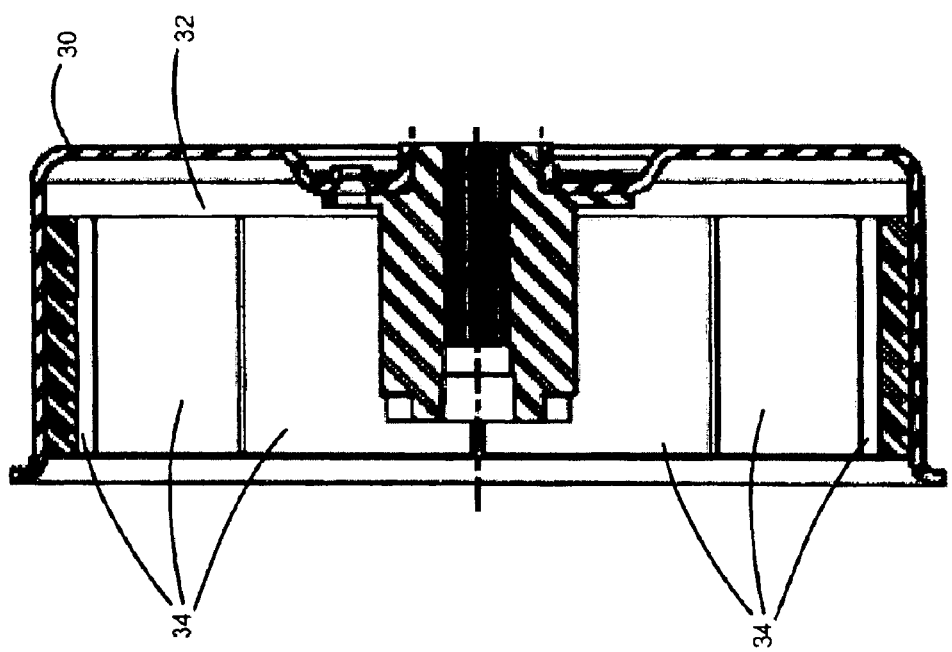

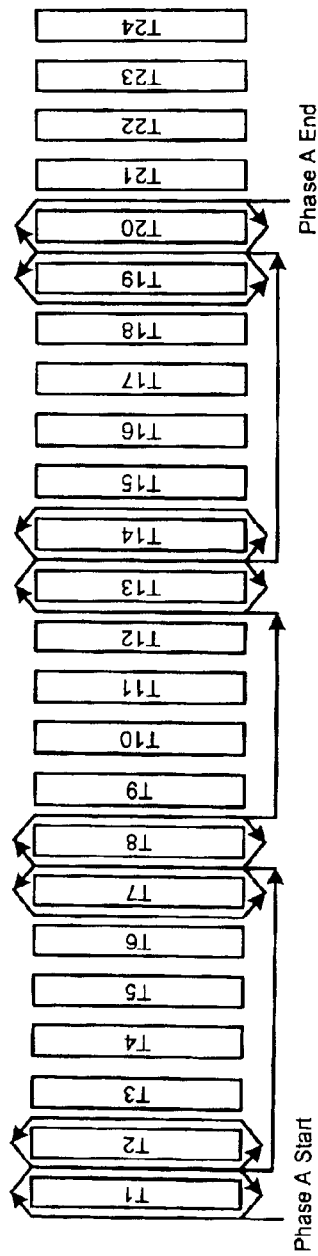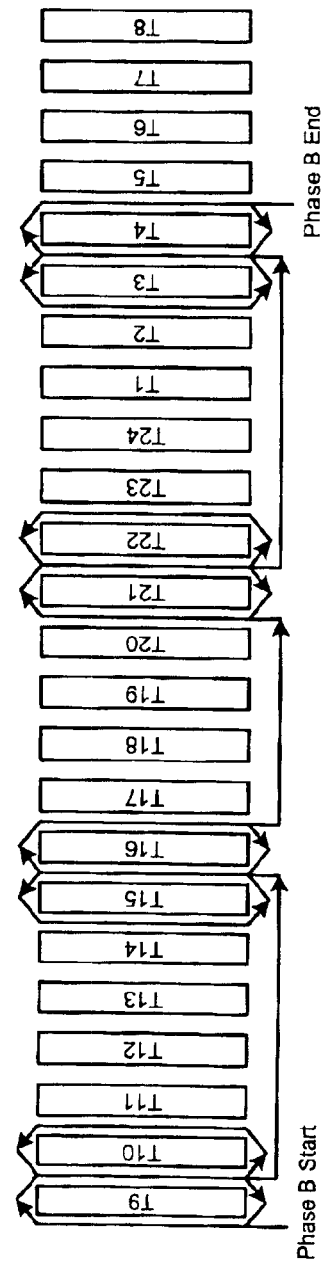
*Figure 5A*  *Figure 5B*

BRUSHLESS PERMANENT MAGNET MOTOR WITH HIGH POWER DENSITY, LOW COGGING AND LOW VIBRATION

FIELD OF THE INVENTION

The present invention relates to electric machines, and more particularly to brushless permanent magnet (BPM) electric machines with low cogging torque, high power density and low vibration.

BACKGROUND OF THE INVENTION

Electric machines, such as motors and generators, typically include a stator that is mounted inside a housing and a rotor that is supported for rotation relative to the stator. Electric machines are often integrated into devices such as appliances. The size and/or capacity of the device incorporating the electric machine may be an important factor in the purchasing decision. The size and power of the electric machine also has a significant impact on the overall size and capacity, respectively, of the device.

The power density of an electric machine is defined as the ratio of the power output and the volume of electric machine. A relatively high power density (e.g., high power output relative to volume) is usually desirable. The high power density allows the electric machine to have either a smaller overall size for a given power output or a higher output for a given size.

When the electric machine rotates during operation, the electric machine vibrates, which produces noise. The noise level of the electric machine may be an important factor in the buying decision. Therefore, it is desirable to decrease vibration, which reduces noise. Conventional approaches for reducing vibration tend to decrease power density as well. In other words, reduced vibration and noise has been achieved at the cost of reduced power output and/or increased volume.

SUMMARY OF THE INVENTION

Accordingly, the present invention provides a brushless permanent magnet electric machine having a stator assembly including a stator core that defines (12×n) slots and stator teeth having a generally "T"-shaped cross section. Winding wire is wound around the stator teeth, wherein a radially outer edge of the stator teeth define a crowned surface. A rotor includes permanent magnets defining (12±2)n poles, wherein n is an integer greater than zero.

In one feature, the stator core is located inside of the rotor.

In another feature, the stator core is formed by a plurality of stacked stator laminations.

In another feature, a first radius of the crowned surface is less than a second radius defined by a circle that is tangent to a radially outermost point of the crowned surface of the stator teeth.

In still another feature, a slot opening is an angle between circumferential facing edges of adjacent stator teeth and tooth pitch is an angle between centers of adjacent stator teeth, wherein the slot opening is within a range of 10% to 20% of the tooth pitch.

In yet another feature, a first air gap between an end of the crowned surface and the permanent magnets is within a range of 1.25 to 2.00 times a second air gap between a center of the crowned surface and the permanent magnets.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a cross-sectional view of a rotor of the BPM electric machine;

FIG. 5A is an exemplary stator winding diagram for a first phase of a stator assembly according to the present invention;

FIG. 5B is an exemplary stator winding diagram for a second phase of the stator assembly according to the present invention;

DETAILED DESCRIPTION OF THE PREFERRED EMBODIMENTS

Figure 1:
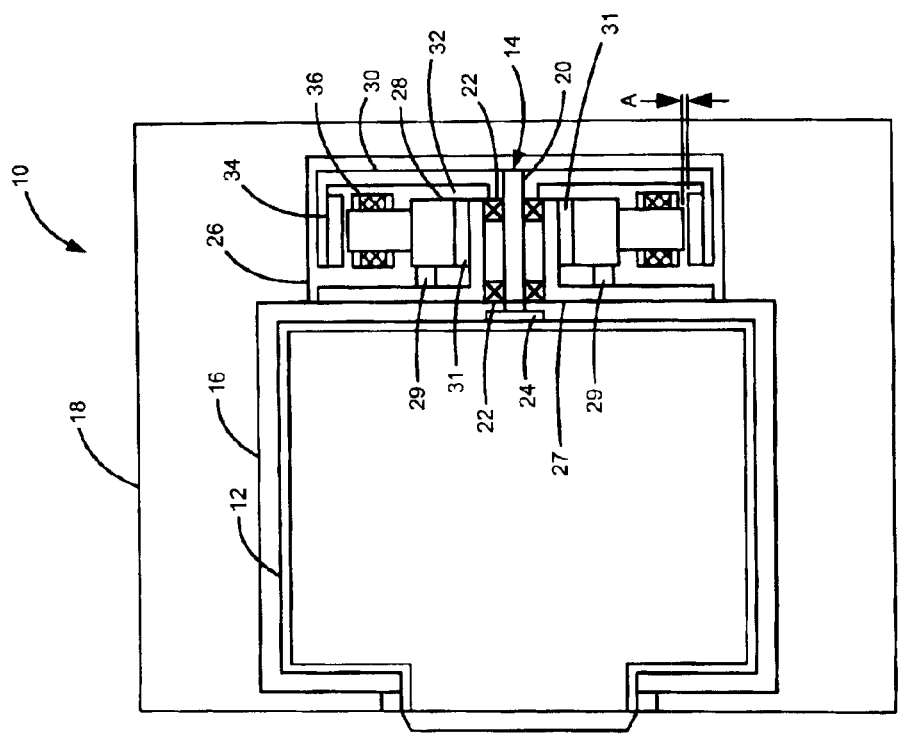
FIG. 1 is a schematic illustration of a device including a rotating member that is driven by a brushless permanent magnet (BPM) electric machine according to the present invention.

The following description of the preferred embodiments is merely exemplary in nature and is in no way intended to limit the invention, its application, or uses. For purposes of clarity, the same reference numbers will be used in the drawings to identify similar elements.

Referring now to FIG. 1, a device 10 is shown that includes a rotating member 12 that is driven by a brushless, permanent magnet (BPM) electric machine 14. An exemplary device 10 is a washing machine where the rotating member 12 is a tumbler. The rotating member 12 is rotatably supported within a cavity 16 defined by a housing 18. A shaft 20 couples the rotating member 12 to the electric machine 14. The shaft 20 is rotatably supported by bearings 22 and includes a first end coupled to the rotating member 12 by a coupling 24. A second end of the shaft 20 is coupled to the electric machine 14.

The electric machine 14 is an inside-out, brushless permanent magnet (BPM) electric machine and is supported within a machine cavity 26 of the housing 18. The electric machine 14 includes an internal stator assembly 28 and an external rotor assembly 30. The internal stator assembly 28 is fixed to a mounting bracket 27 by supports 29. An air gap 31 is formed between the internal stator assembly and the mounting bracket 27. The external rotor assembly 30 is coupled to the rotating member 12 by the shaft 20. The external rotor assembly 30 is drum shaped and defines a donut-shaped cavity 32 within which the internal stator assembly 28 is disposed. Permanent magnets 34 are mounted to an internal surface of the external rotor assembly 30 and preferably include two or three magnetic poles per magnet. The internal stator assembly 28 includes windings 36 that are wound around one or more of the stator teeth. Electric current that flows through the windings 36 generates a rotating magnetic field that interacts with the magnetic poles of the permanent magnets 34 to rotate the external rotor assembly 30 relative to the stator assembly 28.

Figure 2:
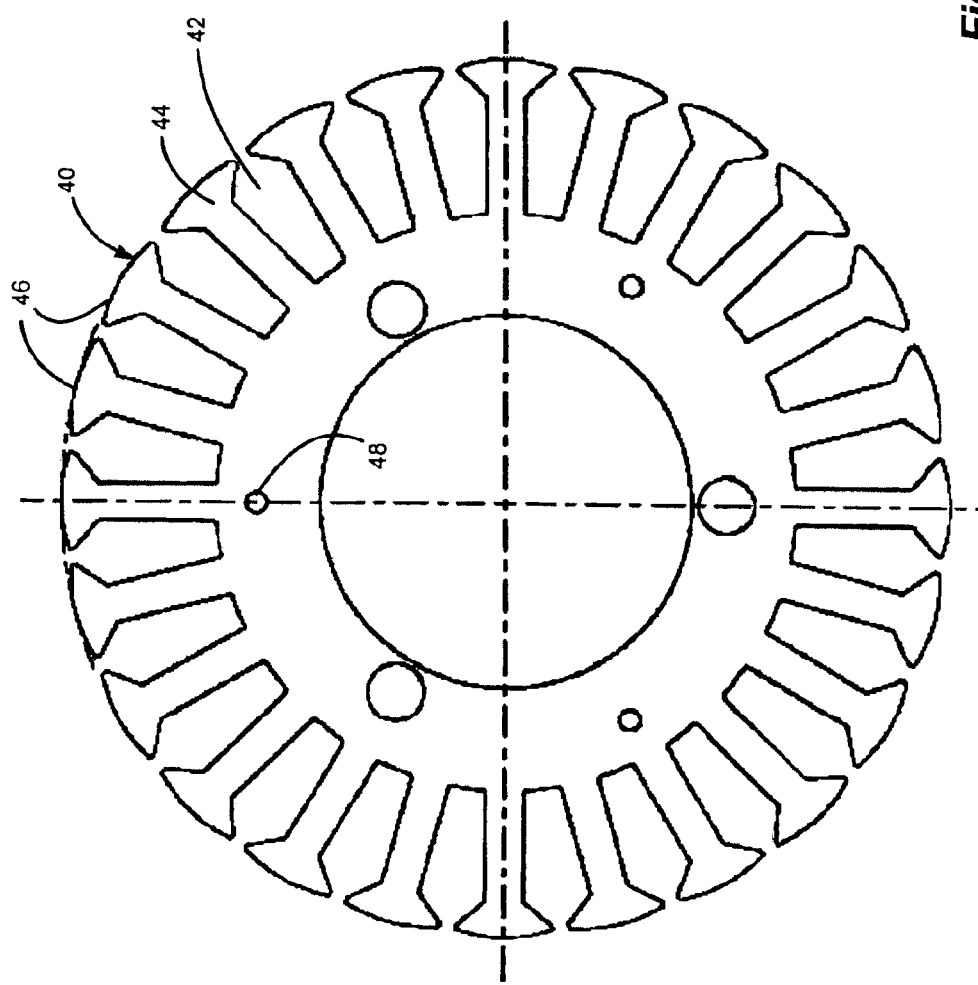
FIG. 2 is a plan view of a stator lamination of the (BPM) electric machine according to the present invention.
Figure 3:
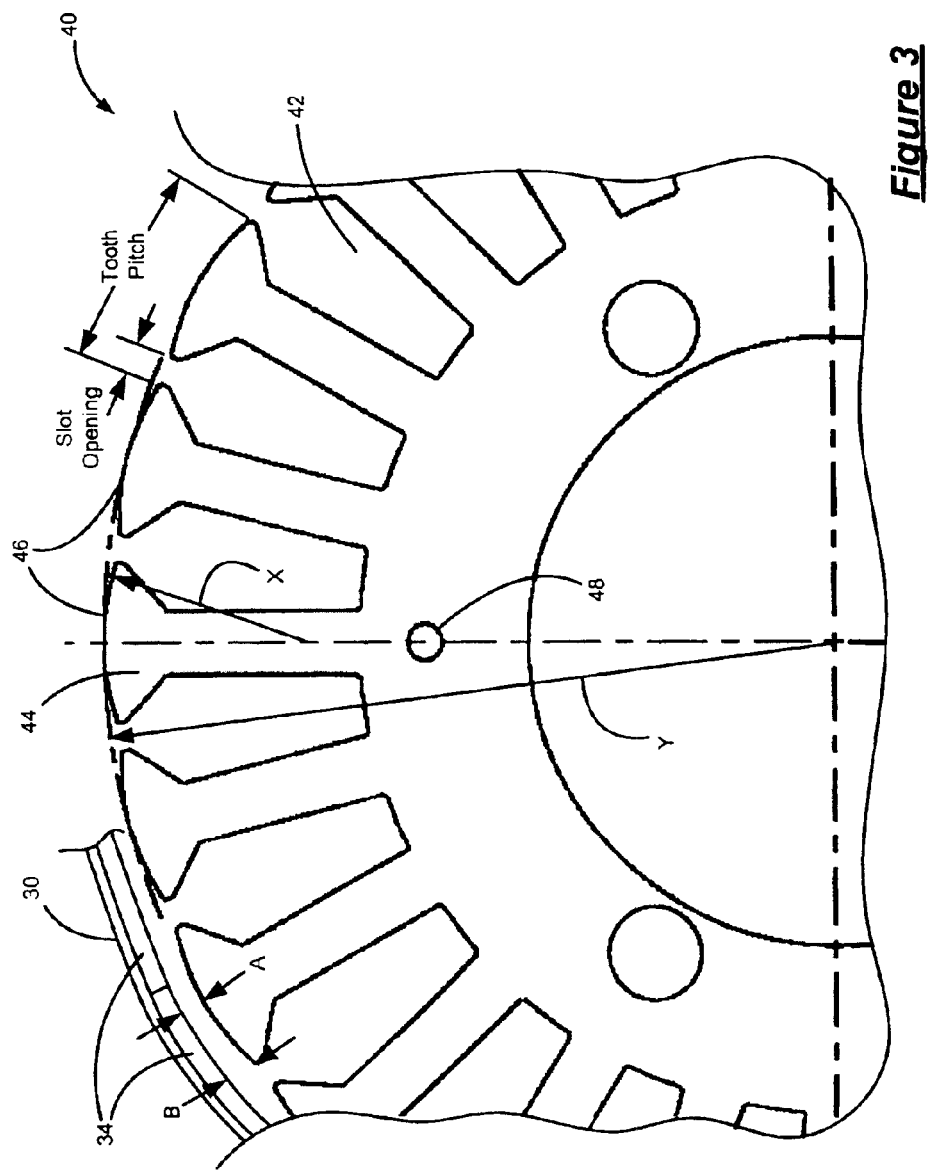
FIG. 3 is an enlarged plan view of a portion of the stator lamination of FIG. 2.

Referring now to FIGS. 1, 2 and 3, the internal stator assembly 28 includes a plurality of stator laminations 40 that are stacked together to form a stator. Each stator lamination 40 defines a plurality of slots 42 that are located between generally "T" shaped stator teeth 44. The slots 42 include a slot opening formed between the teeth 44. Tooth pitch is defined as the angle between corresponding faces of two adjacent teeth 44 as illustrated in FIG. 3. The angle of the slot opening between the teeth 44 is preferably within a range of 10% to 20% of the tooth pitch. The exemplary internal stator assembly of FIGS. 2 and 3 includes 24 slots. A series of bores 48 are provided to enable passage of fasteners (not shown) for attaching the stator to the housing 18.

As best seen in FIG. 3, radially outer faces 46 of the stator teeth 44 are crowned and define a radius (x) that is less than a radius (y) of the stator laminations. More particularly, the radius y defines the distance from the tips of the stator teeth 44 to the center of the stator lamination. The radius x defines the crown arc of the outer faces 46 of the stator teeth 44. An air gap (A) (see FIG. 1) is defined between the internal stator assembly 28 and the permanent magnets 34 of the external rotor assembly 30. The crown is formed such that air gaps (B) at the ends of the crowned face 46 are preferably 1.25 to 2.00 times the size of the air gap (A) (see FIG. 3).

Referring now to FIGS. 1 and 4, a cross-sectional view of the rotor assembly 30 is shown. The rotor assembly 30 of FIGS. 1 and 4 is exemplary in nature and includes 10 permanent magnets 34. The number of permanent magnets 34 can vary according to the present invention as discussed further below.

The stator laminations 40 each define (12×n) slots 42 and are wound to correspond to (12±2)n magnetic poles. The value n is an integer that is greater than zero (i.e., n=1, 2, 3, 4, . . . ). Exemplary slot and pole combinations defined by the stator laminations 40 can include 12 slots with 10 poles, 12 slots with 14 poles, 24 slots with 20 poles, 24 slots with 28 poles, 36 slots with 30 poles, 36 slots with 42 poles, etc. For example, the stator assembly 28, described in detail above, includes 24 slots and the rotor assembly 30 includes 20 poles (i.e., 10 permanent magnets having two poles each).

Figure 5C:
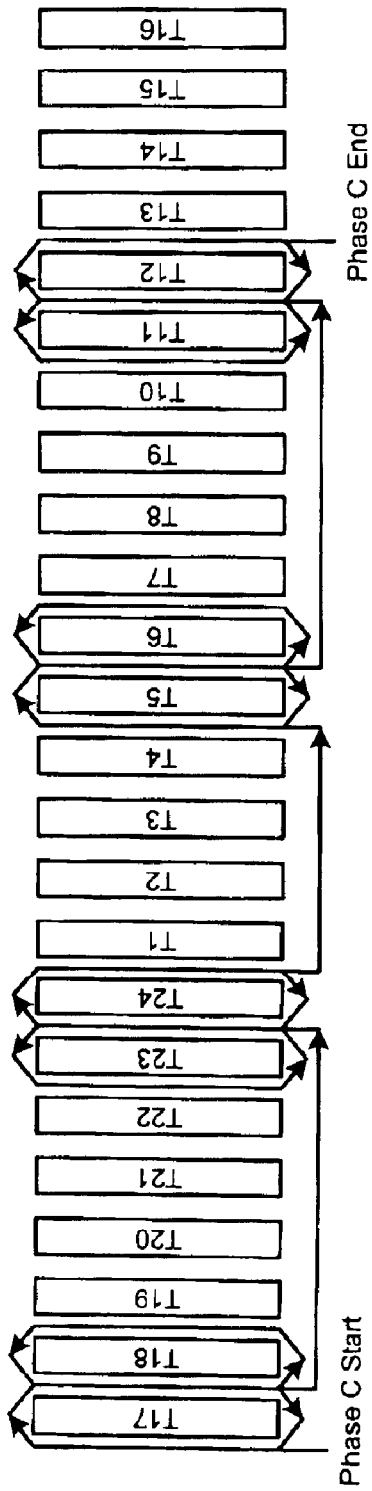
FIG. 5C is an exemplary stator winding diagram for a third phase of the stator assembly according to the present invention.

Referring now to FIGS. 5A, 5B and 5C, exemplary stator winding diagrams are shown for phases A, B and C, respectively of the 24 slot, 20 pole electric machine (i.e., n=2 with (12−2)n poles) according to the present invention. As discussed above with reference to FIGS. 2, 3 and 4, the exemplary internal stator assembly 28 includes 24 slots and 24 teeth and the exemplary rotor assembly 30 includes 20 poles (10 permanent magnets). The phase windings 36, however, are wound to correspond to the alternating poles of the rotor assembly 30.

The phase A windings are wound across teeth T1 and T2, T7 and T8, T13 and T14, and T19 and T20 as shown in FIG. 5A. The phase B windings are wound across teeth T9 and T10, T15 and T16, T21 and T22, and T3 and T4 as shown in FIG. 5B. The phase C windings are wound across teeth T17 and T18, T23 and T24, T5 and T6, and T11 and T12 as shown in FIG. 5C.

Figure 6:
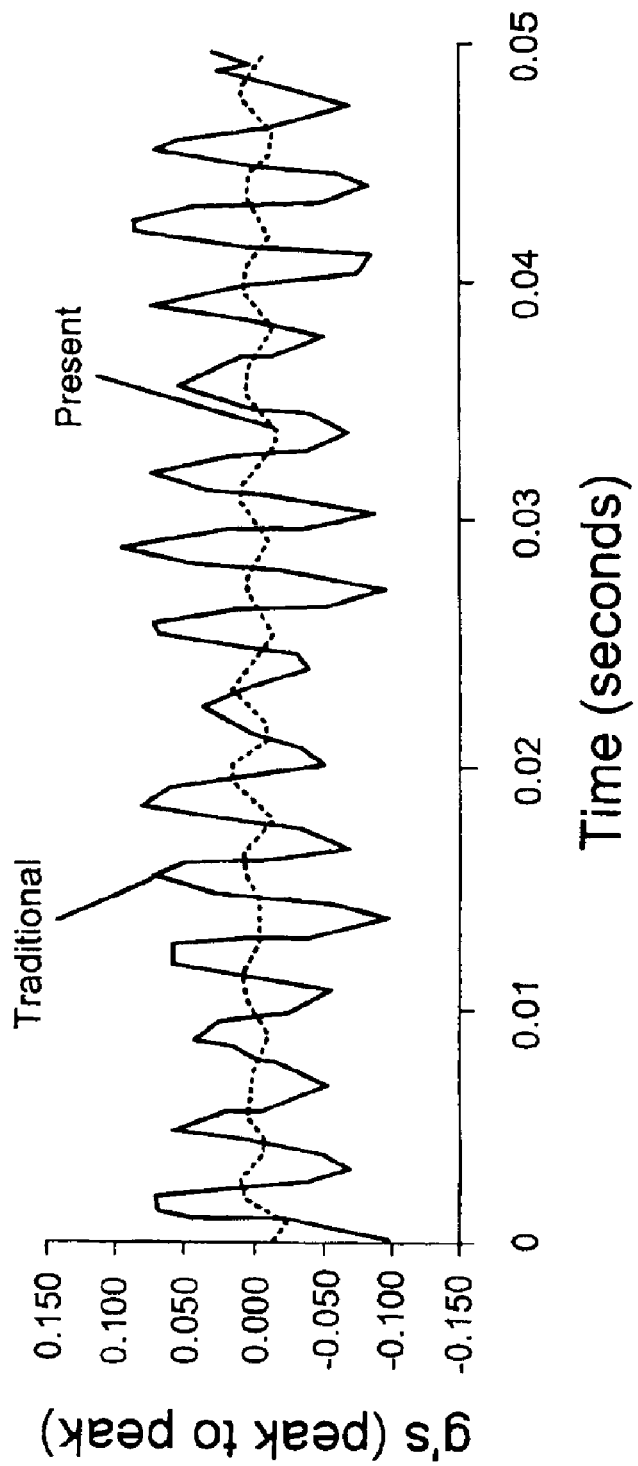
FIG. 6 is a graph comparing vibration characteristics of conventional electric machines to the electric machine according to the present invention.
Figure 7:
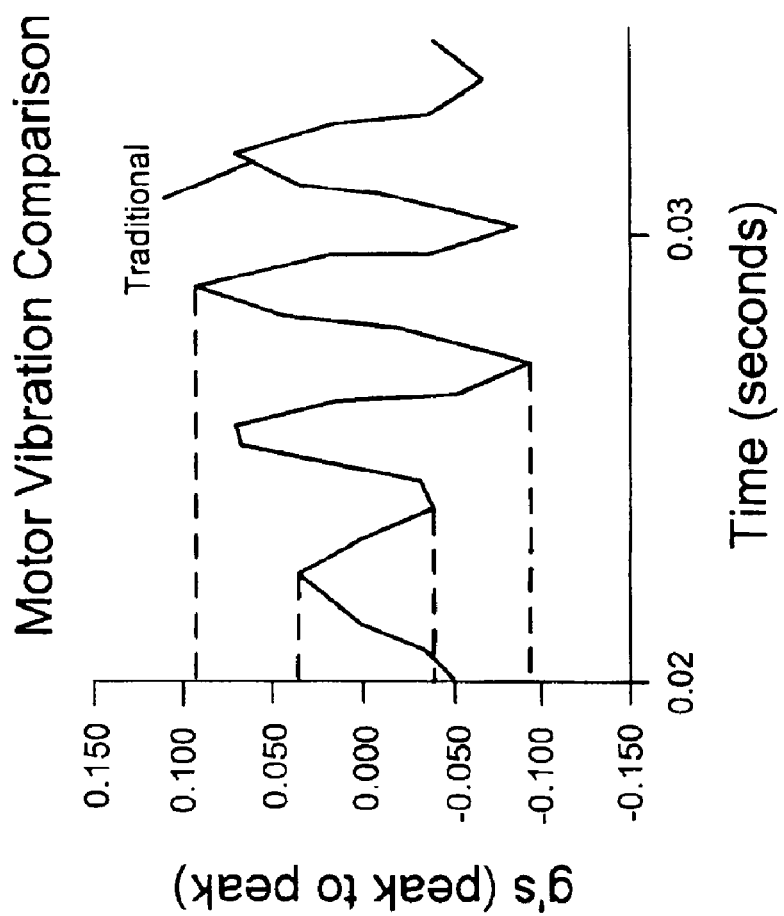
FIG. 7 is a more detailed view of the graph of FIG. 6 illustrating a peak to peak distance of the vibration characteristics of the conventional electric machine.
Figure 8:
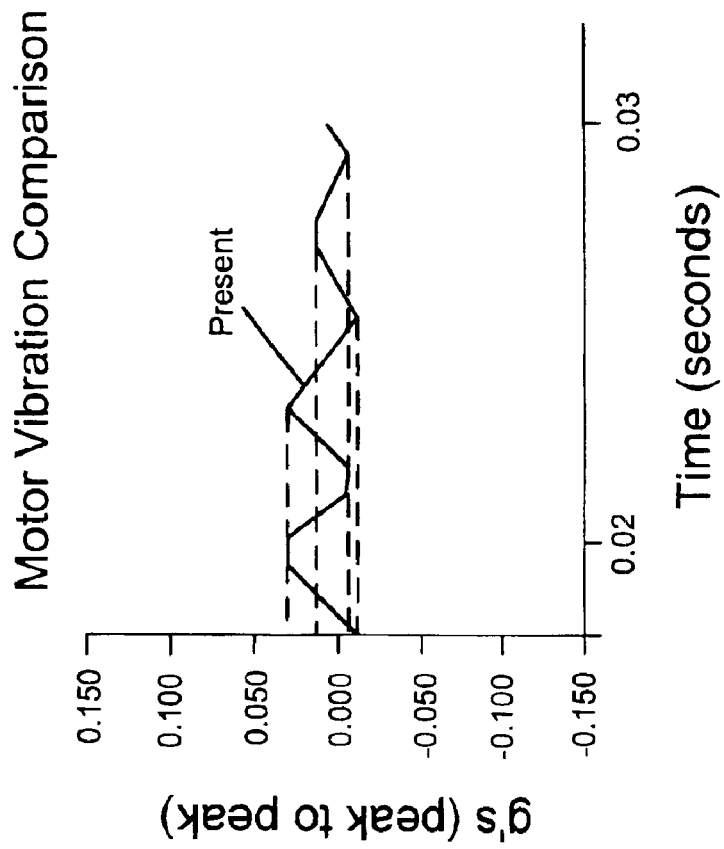
FIG. 8 is a more detailed section of the graph of FIG. 6 illustrating a peak to peak distance of the vibration characteristics of the electric machine according to the present invention.

The combination of (12×n) slots and (12±2)n poles with crowned pole end faces reduces cogging and vibration. As a result, the noise of the electric machine is also reduced. Referring now to FIGS. 6 through 8, a vibration comparison is provided between a conventional electric machine and an electric machine according to the present invention. As can be seen, the conventional machine induces vibration at higher frequency and with a higher amplitude. More specifically, the largest peak to peak value is approximately 0.180 g's and the smallest peak to peak value is approximately 0.070 g's (see FIG. 7). The electric machine according to the present invention induces vibration at a lower frequency and with significantly lower amplitude than the conventional electric machine. More specifically, the largest peak to peak value is approximately 0.040 g's which is a 78% reduction. The smallest peak to peak value is approximately 0.020 g's (see FIG. 8) which is a 71% reduction.

The reduced vibration and noise generation is achieved with a relatively high power density. The power density is defined as a ratio between the power output and the volume of the electric machine. Table 4, below, provides a comparison between the conventional electric machine and the electric machine according to the present invention.

TABLE 4

|  | Conventional | Present |
|---|---|---|
| Stator |  |  |
| Stack (in) | 1.278 | 1.250 |
| Outside Diameter (in) | 10.430 | 9.680 |
| Slots | 36 | 36 |
| Bore (in) | 5.00 | 5.00 |
| Slot Fill | 46% | 42% |
| Rotor |  |  |
| Outside Diameter (in) | 11.14 | 10.5 |
| Air Gap (in) | 0.043 | 0.040 |
| Magnet Poles | 48 | 30 |
| Magnet Material | Ferrite | Ferrite |
| Material Volume (in$^3$) | 487 | 432 |

While the power output of the machines is equivalent, the volume of the machine according to the present invention is approximately 11% lower. Thus, the power density of the electric machine according to the present invention is approximately 12.6% higher than that of the conventional electric machines.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A brushless permanent magnet electric machine, comprising:
   a stator assembly including a stator core that defines (12×n) slots, stator teeth having a generally "T"-shaped cross section, and winding wire wound around said stator teeth, wherein a radially outer edge of said stator teeth defines a crowned surface wherein a first radius of said crowned surface is less than a second radius defined by a circle that is tangent to a radially outermost point of said crowned surface of said stator teeth; and a rotor including permanent magnets defining (12±2)n poles, wherein n is an integer greater than zero.

2. The brushless permanent magnet electric machine of claim 1 wherein said stator is located inside of said rotor.

3. The brushless permanent magnet electric machine of claim 1 wherein said stator core is formed by a plurality of stacked stator plates.

4. The brushless permanent magnet electric machine of claim 1 wherein a slot opening is an angle between circumferential facing edges of adjacent stator teeth and a tooth pitch is an angle between centers of adjacent stator teeth and wherein said slot opening is within a range of 10% to 20% of said tooth pitch.

5. The brushless permanent magnet electric machine of claim 1 wherein a first air gap between an end of said crowned surface and said permanent magnets is within a range of 1.25 to 2.00 times a second air gap between a center of said crowned surface and said permanent magnets.

6. An inside-out brushless permanent magnet electric machine, comprising:

an internal stator assembly including a stator core that defines (12×n) slots, stator teeth having a generally "T"-shaped cross section, and winding wire wound around said stator teeth, wherein a radially outer edge of said stator teeth defines a crowned surface wherein a first radius of said crowned surface is less than a second radius defined by a circle that is tangent to a radially outermost point of said crowned surface of said stator teeth; and an external rotor assembly that rotates about said internal stator assembly and that includes permanent magnets defining (12±2)n poles, wherein n is an integer greater than zero.

7. The inside-out brushless permanent magnet electric machine of claim 6 wherein said stator core is formed by a plurality of stacked stator plates.

8. The inside-out brushless permanent magnet electric machine of claim 6 wherein a slot opening is an angle between circumferential facing edges of adjacent stator teeth and tooth pitch is an angle between centers of adjacent stator teeth, and wherein said slot opening is within a range of 10% to 20% of said tooth pitch.

9. The inside-out brushless permanent magnet electric machine of claim 6 wherein a first air gap between an end of said crowned surface and said permanent magnets is within a range of 1.25 to 2.00 times a second air gap between a center of said crowned surface and said permanent magnets.

10. A brushless permanent magnet electric machine, comprising:

a stator assembly including a stator core that defines (12×n) slots, stator teeth having a generally "T"-shaped cross section, and winding wire wound around said stator teeth, wherein a radially outer edge of said stator teeth defines a crowned surface, and a slot opening between adjacent stator teeth is at least 10% of a tooth pitch of said adjacent stator teeth; and a rotor including permanent magnets defining (12±2)n poles, wherein n is an integer greater than zero.

11. The brushless permanent magnet electric machine of claim 10 wherein said stator is located inside of said rotor.

12. The brushless permanent magnet electric machine of claim 10 wherein said stator core is formed by a plurality of stacked stator plates.

13. The brushless permanent magnet electric machine of claim 10 wherein a first radius of said crowned surface is less than a second radius defined by a circle that is tangent to a radially outermost point of said crowned surface of said stator teeth.

14. The brushless permanent magnet electric machine of claim 10 wherein said slot opening is within a range of 10% to 20% of said tooth pitch.

15. The brushless permanent magnet electric machine of claim 10 wherein a first air gap between an end of said crowned surface and said permanent magnets is within a range of 1.25 to 2.00 times a second air gap between a center of said crowned surface and said permanent magnets.

* * * * *